US011240282B2

United States Patent
Wilson et al.

(10) Patent No.: US 11,240,282 B2
(45) Date of Patent: Feb. 1, 2022

(54) PLUGGABLE COMPONENTS FOR AUGMENTING DEVICE STREAMS

(71) Applicant: Microsoft Technology Licensing, LLC, Redmond, WA (US)

(72) Inventors: Mei L. Wilson, Redmond, WA (US); Christian P. Larson, Kirkland, WA (US); Sang K. Choe, Redmond, WA (US); Yin Li, Sammamish, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/881,496

(22) Filed: May 22, 2020

(65) Prior Publication Data

US 2020/0287953 A1 Sep. 10, 2020

Related U.S. Application Data

(62) Division of application No. 15/362,547, filed on Nov. 28, 2016, now Pat. No. 10,673,917.

(51) Int. Cl.
*G06F 15/16* (2006.01)
*H04L 29/06* (2006.01)
(Continued)

(52) U.S. Cl.
CPC ............ *H04L 65/602* (2013.01); *G06F 3/002* (2013.01); *G06F 3/005* (2013.01); *G06F 3/038* (2013.01);
(Continued)

(58) Field of Classification Search
CPC ....... H04L 65/602; H04L 67/12; G06F 3/002; G06F 3/038; G06F 3/005; G06F 3/165;
(Continued)

(56) References Cited

U.S. PATENT DOCUMENTS

| 2014/0156833 | A1* | 6/2014 | Robinson | H04L 43/12 709/224 |
| 2014/0237595 | A1* | 8/2014 | Sridhara | G06F 21/55 726/23 |
| 2015/0335295 | A1* | 11/2015 | Park | A61B 5/7285 340/870.07 |
| 2016/0050128 | A1* | 2/2016 | Schaible | H04L 67/2823 709/218 |

(Continued)

FOREIGN PATENT DOCUMENTS

| CN | 201499199 U | 6/2010 |
| CN | 105574890 A | 5/2016 |
| CN | 105745930 A | 7/2016 |

OTHER PUBLICATIONS

"Office Action Issued in European Patent Application No. 17817361. 3", dated Jul. 5, 2021, 4 Pages.
(Continued)

*Primary Examiner* — Karen C Tang
(74) *Attorney, Agent, or Firm* — Arent Fox LLP

(57) ABSTRACT

Described are examples for providing stream augmenting components. A stream augmenting component having an augmentation function indicating a plurality of interfaces to one or more devices and an output stream can be initialized. At least a portion of the plurality of interfaces for the one or more devices can be accessed to at least one of obtain stream output from the one or more devices or control the one or more devices. A plurality of stream outputs from the one or more devices can be virtualized to the output stream at least in part by modifying or correlating data received over the plurality of stream outputs. The stream augmenting component can output the output stream to one or more other stream augmenting components or applications via at least another portion of the one or more interfaces.

20 Claims, 7 Drawing Sheets

(51) Int. Cl.

| | |
|---|---|
| *G06F 3/00* | (2006.01) |
| *G06F 3/038* | (2013.01) |
| *G06F 3/16* | (2006.01) |
| *G06F 13/00* | (2006.01) |
| *G06F 9/4401* | (2018.01) |
| *G06F 9/445* | (2018.01) |
| *H04L 29/08* | (2006.01) |
| *G06F 9/54* | (2006.01) |

(52) U.S. Cl.
CPC ............ *G06F 3/165* (2013.01); *G06F 9/4411* (2013.01); *G06F 9/44526* (2013.01); *G06F 13/00* (2013.01); *H04L 67/12* (2013.01); *G06F 9/544* (2013.01)

(58) Field of Classification Search
CPC .... G06F 13/00; G06F 9/4411; G06F 9/44526; G06F 9/544
USPC .................................................. 709/231, 224
See application file for complete search history.

(56) References Cited

U.S. PATENT DOCUMENTS

| | | | |
|---|---|---|---|
| 2016/0070265 A1* | 3/2016 | Liu ........................ | G01C 21/00 |
| | | | 701/3 |
| 2016/0124945 A1 | 5/2016 | Cruse et al. | |
| 2016/0320860 A1* | 11/2016 | Josephson ............ | G06F 3/04845 |
| 2016/0334545 A1* | 11/2016 | Varelas ................... | H04W 4/02 |
| 2017/0039765 A1* | 2/2017 | Zhou ........................ | G06T 7/55 |
| 2017/0054571 A1* | 2/2017 | Kitchen .............. | H04L 12/4625 |
| 2017/0366616 A1* | 12/2017 | Rodrigues Nascimento ............... | |
| | | | H04W 4/44 |

OTHER PUBLICATIONS

"First Office Action and Search Report Issued in Chinese Patent Application No. 201780072642 4", dated Sep. 29, 2021, 13 Pages.

Qi, et al., "Research on Video Image Enhancement Technology", In Computer Knowledge and Technology, vol. 10, Issue 19, Jul. 2014, 3 Pages.

* cited by examiner

PLUGGABLE COMPONENTS FOR AUGMENTING DEVICE STREAMS

CLAIM OF PRIORITY UNDER 35 U.S.C. § 119

The present Application for Patent is a divisional of U.S. patent application Ser. No. 15/362,547 entitled "PLUGGABLE COMPONENTS FOR AUGMENTING DEVICE STREAMS" filed Nov. 28, 2016, which is assigned to the assignee hereof and hereby expressly incorporated by reference herein.

BACKGROUND

Many computing devices employ input devices that produce output streams for consumption by applications operating on the computing device. These input devices can include sensor devices (e.g., cameras, biometric devices, etc.) that obtain and output data in streams including a plurality of data frames, where the data frames are output according to a cadence. A given input device is typically associated with a driver at the operating system of the computing device that provides an interface to the input device allowing applications executing via the operating system to access and utilize the output stream for a given input device. The drivers, however, are typically provided by a hardware vendor of the input device, and are thus limited to exposing functions of a single input device that are defined by the hardware vendor when implementing the driver.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computing device for providing stream augmenting components is provided. The computing device includes a memory storing one or more parameters or instructions for executing a stream server, where the stream server exposes one or more interfaces related to one or more stream augmenting components, and at least one processor coupled to the memory. The at least one processor is configured to initialize a stream augmenting component having an augmentation function indicating a plurality of interfaces to one or more devices and an output stream, access at least a portion of the plurality of interfaces for the one or more devices to at least one of obtain stream output from the one or more devices or control the one or more devices, virtualize a plurality of stream outputs from the one or more devices to the output stream at least in part by modifying or correlating data received over the plurality of stream outputs, and output, by the stream augmenting component, the output stream to one or more other stream augmenting components or applications via at least another portion of the one or more interfaces.

In another example, a method for providing stream augmenting components is provided. The method includes initializing a stream augmenting component having an augmentation function indicating a plurality of interfaces to one or more devices and an output stream, accessing at least a portion of the plurality of interfaces for the one or more devices to at least one of obtain stream output from the one or more devices or control the one or more devices, virtualizing a plurality of stream outputs from the one or more devices to the output stream at least in part by modifying or correlating data received over the plurality of stream outputs, and outputting, by the stream augmenting component, the output stream to one or more other stream augmenting components or applications via at least another portion of the one or more interfaces.

In another example, a non-transitory computer-readable medium including code executable by one or more processors for providing stream augmenting components is provided. The code includes code for initializing a stream augmenting component having an augmentation function indicating a plurality of interfaces to one or more devices and an output stream, accessing at least a portion of the plurality of interfaces for the one or more devices to at least one of obtain stream output from the one or more devices or control the one or more devices, virtualizing a plurality of stream outputs from the one or more devices to the output stream at least in part by modifying or correlating data received over the plurality of stream outputs, and outputting, by the stream augmenting component, the output stream to one or more other stream augmenting components or applications via at least another portion of the one or more interfaces.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
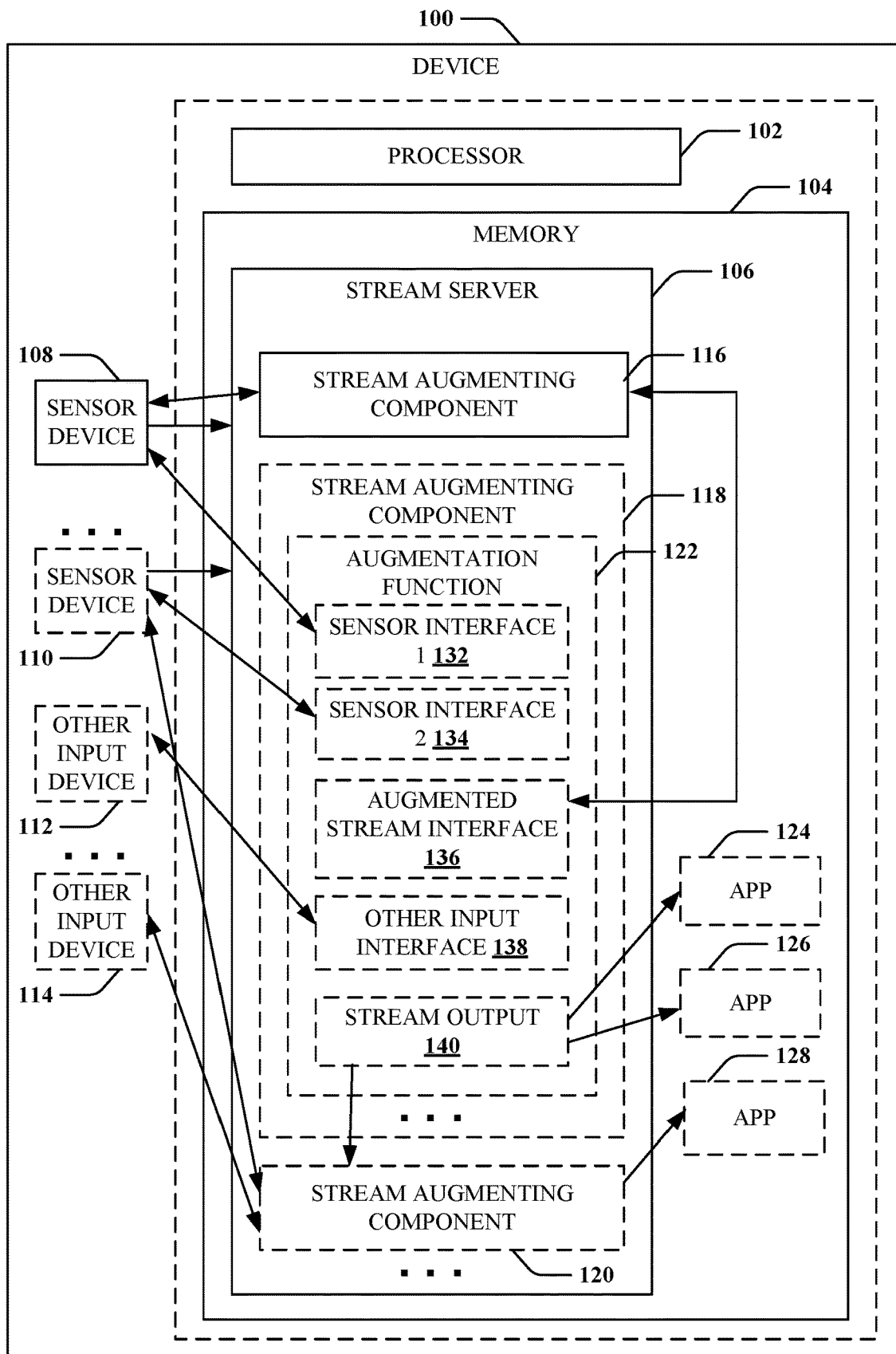
FIG. 1 is a schematic diagram of an example of a device for implementing one or more stream augmenting components.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing pluggable components, which are referred to herein as stream augmenting components, for augmenting device output streams and/or controlling the devices to produce the output streams. The augmented device output streams are exposed to one or more applications to allow the applications to utilize the augmented device output for one or more purposes. The stream augmenting components can be associated with a stream augmenting configuration that defines one or more augmentation functions of the stream augmenting components. For example, the stream augmenting configuration indicates, for each augmentation function, a plurality of interfaces (e.g., of input devices in a computing device) used by the augmentation function, and one or more stream outputs provided by the augmentation function. Additionally, the stream output(s) of a given augmentation function can be exposed to other stream augmenting components (e.g., as an interface) for use as an input stream thereto. Moreover, the stream augmenting components are pluggable in that one or more augmentation functions of a first stream augmenting component can be enabled or disabled based on existence/activation of a requested interface to a device or other stream augmenting component (e.g., whether the interface corresponds to a stream output of an input device or an augmented output stream of an augmentation component of a second stream augmenting component, an interface for controlling the input device, etc.).

A stream server can be implemented on a computing device to allow for communicating with input devices of a computing device such to obtain output streams related to input at the input devices of the computing device, control the input devices to provide the output streams, etc. The stream server can also allow the pluggable stream augmenting components to be initialized and used to obtain and augment output streams of multiple input devices, control the multiple input devices, etc. The stream augmenting components can be extended by leveraging output of other stream augmenting components to provide further functionality. This can allow various sources (e.g., hardware vendors, original equipment manufacturers (OEM), end users, etc.) to provide stream augmenting components for augmenting output of a given input device or set of input devices, and/or to provide additional functionality based on output of a given stream augmenting component, etc.

In a specific example, a hardware vendor of an input device may provide one or more stream augmenting components having one or more interfaces for obtaining a stream of data from the input device (e.g., as received and/or as augmented by the stream augmenting component(s)). An OEM of a computing device that utilizes the input device may provide another stream augmenting component having one or more augmenting functions for augmenting the data stream from the one or more stream augmenting components provided by the hardware vendor (e.g., to add metadata to the data stream, to combine the data stream with another data stream of another input device or stream augmenting component to provide additional functions etc.). One or more of the functions from the hardware vendor and/or augmenting functions from the OEM, as provided by the corresponding stream augmenting components, may be exposed for use by applications executing on the operating system. Accordingly, when an application utilizes the augmenting functions from the OEM, the augmenting functions may receive the data stream from the stream augmenting components provided by the hardware vendor, further modify the data stream, and provide the output to the application.

In one example use case, the present disclosure may be implemented in a computer device having a plurality of sensors (e.g., cameras or other biometrics sensors, position determining devices, location determining devices, etc.). The computer device may include one or more stream augmenting components that essentially transform the output streams of two or more sensors into at least one new, augmented sensor output stream. For instance, the computing device may employ two cameras, such as a red green blue (RGB) camera and an infrared (IR) camera, and a stream augmenting component can receive input streams relate to the cameras (e.g., via interfaces to the cameras and/or other stream augmenting components that provide output streams of the cameras) and can correlate and/or combine the streams into a single output stream. The stream augmenting components can be pluggable, such that initialization or activation of the stream augmenting components may depend on whether requested interfaces are available at the computing device. As such, implementations of the present disclosure may easily and efficiently provide new, configurable streams of information that may be utilized by an application or other device connected to the computer device without requiring special programming, etc. and in such a way to allow automatic discovery of the stream augmenting components for either one or both of determining which stream augmenting components can be initialized or activated or for generating the stream augmenting components.

Figure 2:
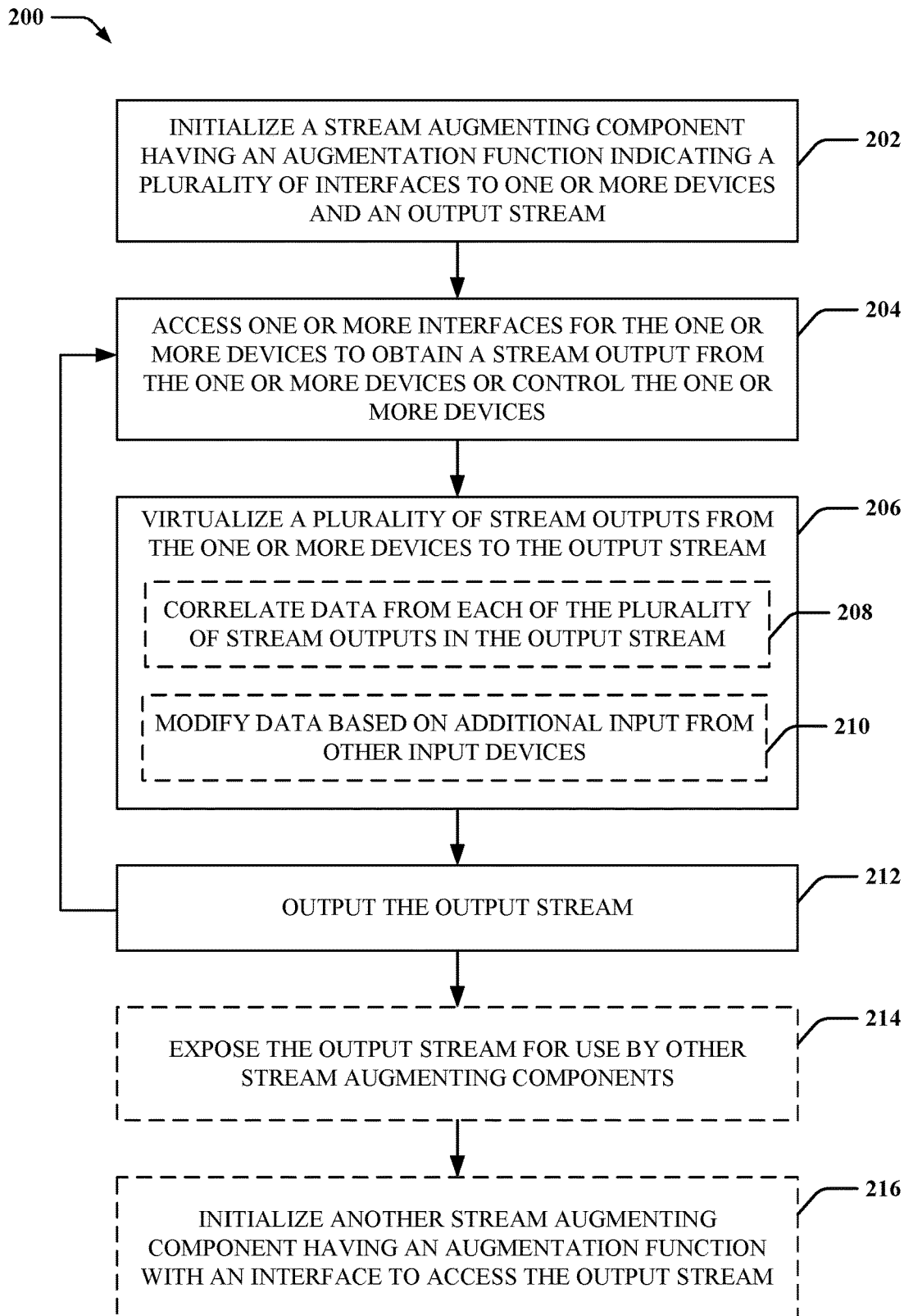
FIG. 2 is a flow diagram of an example of a method for initializing one or more stream augmenting components.
Figure 3:
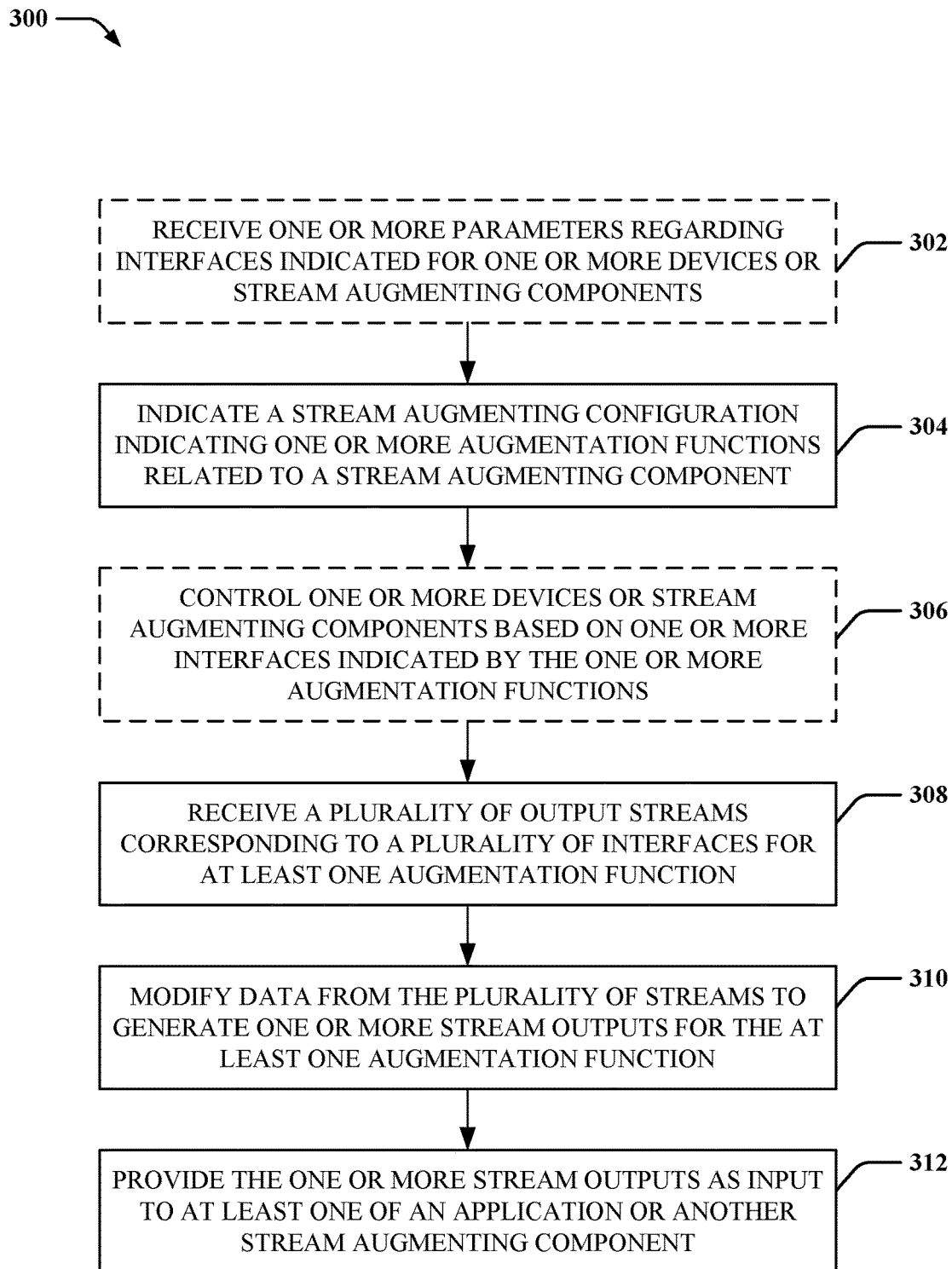
FIG. 3 is a flow diagram of an example of a method for providing one or more stream augmenting components.
Figure 4:
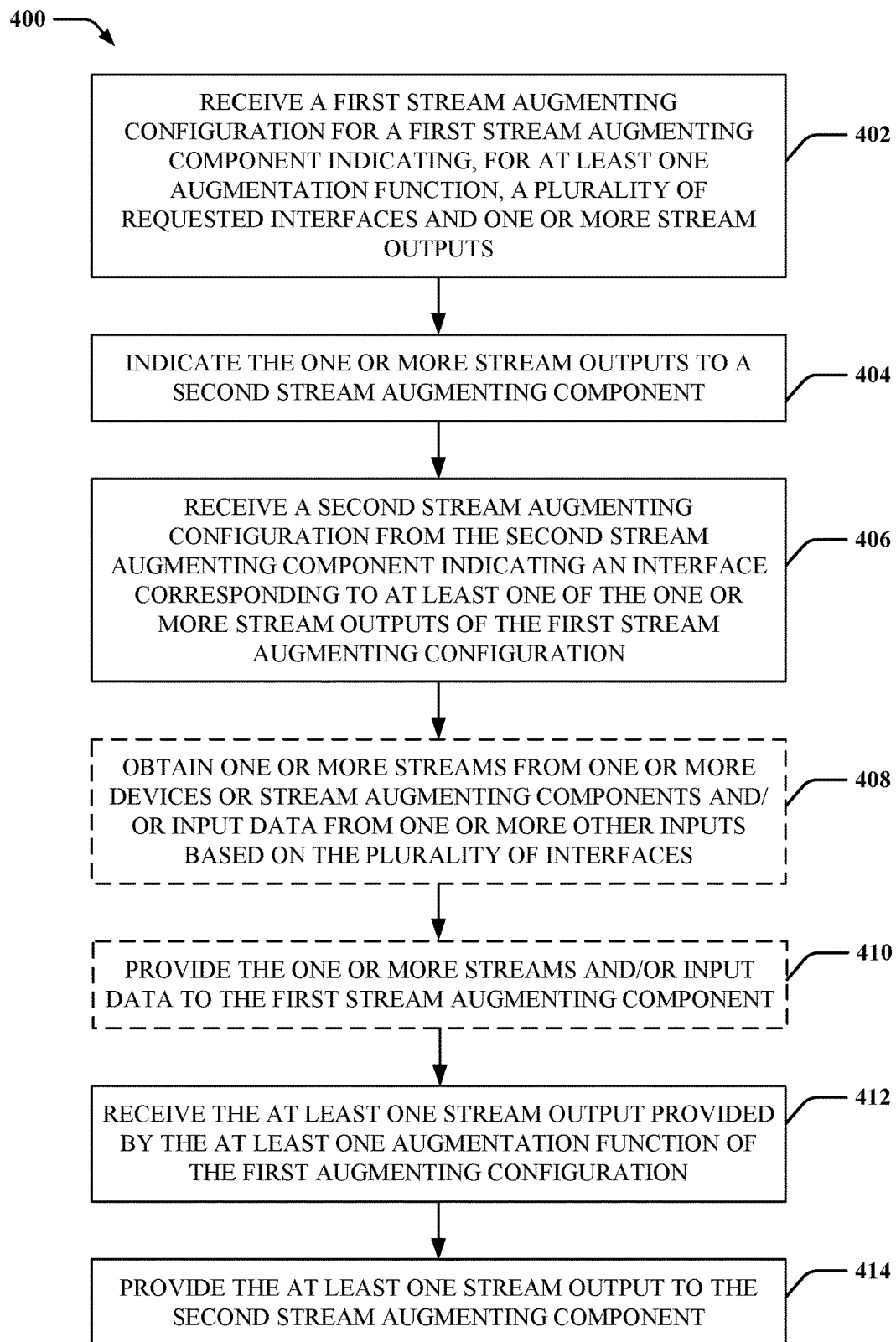
FIG. 4 is a flow diagram of an example of a method for managing one or more stream augmenting components.

Turning now to FIGS. 1-6, examples are depicted with reference to one or more components and one or more methods that may perform the actions or operations described herein, where components and/or actions/operations in dashed line may be optional. Although the operations described below in FIGS. 2-4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 that can implement a stream server for facilitating operating one or more sensor devices, other input devices, etc., which can be based on using one or more pluggable stream augmenting components. In an example, device 100 can include a processor 102 and/or memory 104 configured to execute or store instructions or other parameters related to providing the stream server 106. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein. Device 100 can also include one or more sensor devices 108, 110 for obtaining input (e.g., video input, audio input, biometric input or other input that can be obtained in frames of data, etc.) and outputting a corresponding output stream of data. For example, the one or more sensor devices 108, 110 can include a camera (e.g., a RGB camera, IR camera, depth camera, etc.), which may be video cameras, still image cameras, etc., an eye scan or eye tracking sensor, a fingerprint or touch sensor, a microphone, etc. Device 100 may optionally also include one or more other input devices 112, 114, which may provide additional input data upon request and/or detected events, such as a location device (e.g., a global positioning system (GPS) receiver), a gyroscope, etc. For example, the sensor devices 108, 110, and/or other input devices 112, 114, can be communicatively coupled to the computing device via substantially any wired or wireless interface (e.g., universal serial bus (USB), Firewire, local area network (LAN), wireless LAN (WLAN), Bluetooth, radio frequency identification (RFID), near field communication (NFC), etc.).

In an example, stream server 106 can obtain output streams (e.g., streams of framed data) of sensor devices 108, 110 for exposing as an input to one or more applications, or to one or more stream augmenting components 116, 118, 120, etc., for consumption thereof. Framed data, for example, can correspond to data from the sensor devices 108, 110 that is output according to a cadence. In one example, the framed data can correspond to the data as captured according to the cadence (e.g., frames per second for a camera). In addition, stream server 106 can include one or more stream augmenting components 116, 118, 120 that can define one or more augmentation functions, such as augmentation function 122, for obtaining data from the one or more sensor devices 108, 110, one or more input devices 112, 114, etc., correlating and/or modifying the data, and outputting the data in an augmented output stream for use by one or more applications 124, 126, 128 or other stream augmenting components 116, 118, 120 or corresponding augmentation functions. The stream output 140 may also output framed data, and the data and/or framing parameters (e.g., cadence) may be the same as or modified from the data and/or framing parameters as received from the sensor devices 108, 110, other input devices 112, 114, and/or other augmentation functions, etc.

In a specific example, stream augmenting component 118 can define augmentation function 122, which can be defined to include sensor interface 1 132 to sensor device 108, sensor interface 2 134 to sensor device 110, augmented stream interface 136 to stream augmenting component 116 (e.g., to an augmentation function thereof), other input interface 138 to other input device 112, and a stream output 140 for outputting a stream with data from the various interfaces 132, 134, 136, 138 to one or more applications 124, 126 (and/or to one or more other stream segmenting components 120). For example, the interfaces 132, 134, 136, 138 can correspond to an interface to at least one of receive (e.g., request) an output stream from, or control functionality of, sensor device 108, sensor device 110, stream augmenting component 116 (or a specific augmentation function thereof), other input device 112, etc. Stream augmenting component 118, as shown in FIG. 1, is one specific example of a stream augmenting component, and other stream augmenting components may implement other augmentation functions that utilize other inputs from other sensor devices, other input devices, and/or other stream augmenting components, provide control for such components and/or devices, and/or provide stream outputs. For example, stream augmenting component 116 may include at least one augmentation function that interfaces with sensor device 108 and provides an output stream, which is consumed by augmented stream interface 136. Additionally, for example, stream augmenting component 120 may interface with sensor device 110, other input device 114, and stream augmenting component 118 (e.g., to receive stream output 140), and may provide stream output, which may be consumed by application 128.

In one example, stream augmenting component 118 may include a configuration that advertises or otherwise indicates the various interfaces 132, 134, 136, 138 and stream output 140 for each augmentation function 122 provided by the stream augmenting component 118. In one example, the configuration may indicate, for one or more interfaces 132, 134, 136, 138, one or more requested functions for obtaining stream data from the corresponding device or stream augmenting component, one or more requested functions for controlling the corresponding device or stream augmenting component, etc. Accordingly, stream server 106 can determine augmentation functions for which the requested functions are available, and can activate at least a portion of these augmentation functions for use by other stream augmentation components, applications, etc., which may include additionally exposing corresponding callable functions of the augmentation functions (e.g., to obtain a stream output thereof, to control one or more aspects of the augmentation functions, etc.). In an example, controlling functionality of the devices may include activating or powering on the devices, providing one or more parameters for operating the devices, etc., as described further in examples herein.

For example, stream server 106 can determine to activate the augmentation function 122, and/or associated stream augmenting component 118, such to expose one or more interfaces defined by augmentation function 122 for obtaining stream output 140, where the determination to activate can be based on determining: (1) that sensor devices 108, 110 are available and exposing functions requested by the augmentation function 122 for sensor interface 1 132 and sensor interface 2 134 (e.g., as specified in an associated configuration) to obtain stream output or control the devices; (2) that other input device 112 is available and exposing functions requested by the augmentation function 122 for other input interface 138 (e.g., as specified in the associated configuration) to facilitate querying and/or receiving relevant data or controlling the other input device 112; and/or (3) that stream augmenting component 116 is available and exposing functions requested by the augmentation function 122 for augmented stream interface 136 (e.g., as specified in the associated configuration) for outputting the augmented stream or allowing control of stream augmenting component 116. For example, in this regard, stream server 106 can initially activate stream augmenting component 116 (or an augmentation function thereof) based on determining sensor device 108 is available and exposing functions requested by the stream augmenting component 116, and then may activate augmentation function 122 based at least in part on activating the stream augmenting component 118. Moreover, in this regard, stream server 106 can activate stream augmenting component 120 (or an augmentation function thereof) based on activating augmentation function 122 to output stream output 142, which can be an input to the augmentation function of stream augmenting component 120 (e.g., in addition to determining that sensor device 110 and other input device 114 are available and exposing requested functions).

In some examples, one or more augmentation functions of the stream augmenting components 116, 118, and/or 120 may not be activated or exposed where one or more corresponding interfaces are not available (e.g., because one of the requested functions of a corresponding device or stream augmenting component is not available). Additionally, the stream augmenting components 116 can be organized and exposed in a hierarchy, such that an application 124, 126, 128 and/or higher level stream augmenting components can access outputs of a next lower level stream augmenting component (e.g., applications 124 and 126 can access stream output 140 of stream augmenting component 118 as exposed by stream augmenting component 120). Accordingly, stream augmenting component 120 may hide some or all stream outputs of stream augmenting component 118 from applications 124, 126, 128. In addition, for example, stream server 106 can expose interfaces to the sensor devices 108, 110, other input devices 112, 114, etc. without stream augmenting components, or may allow access to these devices only through available stream augmenting components.

In an example, once activated, an augmentation function of a stream augmenting component can receive data streams and/or requested data from the various inputs, control one or more devices to obtain the data streams and/or requested data, etc., and can modify, correlate, or otherwise use the various data to produce stream output. For example, augmentation function 122 can obtain an output stream from sensor device 108 via sensor interface 1 132 (and/or may control sensor device 108 via the interface), obtain an output stream from sensor device 110 via sensor interface 2 134 (and/or may control sensor device 110 via the interface), obtain an output stream from an augmentation function of stream augmenting component 116 via augmented stream interface 136 (and/or may control the augmentation function via the interface), and obtain other input data from other input device 112 via other input interface 138 (e.g., based on request/response, receiving data based on a subscription or event-driven delivery, etc.). In this example, the augmentation function 122 can modify, correlate, or otherwise use the stream data or other input data in producing at least one stream output 142.

In a specific example, sensor device 108 may be a RGB camera, sensor device 110 may be a depth camera, stream augmenting component 116 may output a lens corrected stream from the RGB camera, and the other input device 112 may be a gyroscope. In this example, stream augmenting component 118 may obtain depth information for one or more objects via sensor interface 2 134, use the depth information to set a depth of the RGB camera via sensor 1 interface 132, receive images from the RGB camera as lens corrected and output from stream augmenting component 116, and correlate the lens corrected images with position data from the gyroscope to produce stream output 142. Thus, for example, stream output 142 may include framed data provided at a cadence, where each frame includes a lens corrected image and at least some frames include gyroscope position information (e.g., in frames where the gyroscope provides a position change notification via sensor interface 2 134). Accordingly, application 124, 126, and/or stream augmenting component 120 can receive the stream output 140 (e.g., as frames sent according to the cadence, where the cadence can correspond to a cadence of the stream augmenting component 116 output), and can utilize the stream output 140 to create larger depth-focused panoramic images using the images obtained from the stream output 140 and the corresponding position information to place the images relative to one another in creating the larger images. In another example, sensor device 108 and sensor device 110 can both be RGB cameras providing three-dimensional images from different angles, and stream augmenting component 118 can provide a correlated output from both cameras to provide three dimensional images. These are specific examples, and many other examples can utilize stream augmenting components to provide more or less complex modifications of stream outputs.

FIG. 2 is a flowchart of an example of a method 200 for initializing and utilizing a stream augmenting component for interfacing with multiple input devices or other stream augmenting components to generate an output stream for consumption by an application or other stream augmenting component. For example, method 200 can be performed by a device 100 and/or one or more components thereof to facilitate executing one or more pluggable stream augmenting components.

In method 200, at action 202, a stream augmenting component, having an augmentation function indicating a plurality of interfaces to one or more devices and an output stream, can be initialized. In an example, stream server 106, e.g., in conjunction with processor 102, memory 104, etc., can initialize a stream augmenting component 116, 118, 120, having an augmentation function 122 indicating a plurality of interfaces to one or more devices (e.g., sensor interface 1 132, sensor interface 2 134, augmented stream interface 136, other input interface 138, etc.) and an output stream (e.g., stream output 140). In an example, the stream augmenting component 118 can indicate (e.g., expose via an interface) one or more augmentation functions, including augmentation function 122, associated interfaces (e.g., interfaces 132, 134, 136, 138 for augmentation function 122), and/or associated outputs (e.g., stream output 140). For example, stream augmenting component 118 can indicate a configuration for the one or more augmentation functions that indicates the various interfaces and corresponding outputs.

In an example, indicating the configuration may be part of registering the stream augmenting component 118 and/or related augmentation functions (e.g., augmentation function 122) with the stream server 106. In one example, the stream augmenting components 116, 118, 120 and/or related configurations can be specified in a driver package for an operating system executing the stream server 106 (on device 100), and registration and/or initialization of the stream augmenting components 116, 118, 120 can occur based on an initialization of drivers by the operating system, an initialization of the stream server 106 on device 100, etc. In one example, when the stream augmenting component 116, 118, 120 is registered and/or initialized, as described, an output stream associated therewith (and/or possibly one or more interfaces for receiving the output stream or for modifying the augmentation functions of the stream augmenting component) can be exposed for registering and/or initializing other stream augmenting components that may use the output stream (or interface). In an example, stream server 106 can utilize the configuration describing each stream augmenting component to determine augmentation functions for which stream augmenting components can be initialized based on whether specific interfaces are available, and can accordingly initialize each available augmentation function.

In this regard, as described, it is possible that some augmentation functions and/or corresponding stream augmenting components are not initialized based on certain output streams or related interfaces to access the output streams or otherwise modify certain devices, augmentation functions, etc. not being available. This can allow the components to be pluggable such to operate with all, some, or no available augmentation functions based on availability of device interfaces, other augmentation functions of other stream augmenting components, etc. where available augmentation functions or related interfaces can be exposed for use.

In method 200, at action 204, one or more interfaces for the one or more devices can be accessed to obtain a stream output from the one or more devices or control the one or more devices. In an aspect, interfaces 132, 134, 136, 138, etc., e.g., in conjunction with stream server 106, processor 102, memory 104, etc., can access one or more interfaces for the one or more devices to obtain a stream output from the one or more devices or control the one or more devices. For example, interfaces 132, 134 can obtain an output stream from sensor devices 108, 110, or can control the sensor devices 108, 110, which may be based on output streams from the devices and/or other devices (e.g., controlling depth for focusing an RGB camera based on depth information in an output stream from a depth camera). In this example, sensor device 108 may expose one or more interfaces for obtaining stream output therefrom or controlling one or more aspects thereof, and sensor interface 1 132, based on instructions defined for the augmentation function 122, can utilize the one or more interfaces to obtain the stream output or control the sensor device 108. Similarly, sensor device 110 may expose one or more interfaces for obtaining stream output therefrom or controlling one or more aspects thereof, and sensor interface 2 134, based on instructions defined for the augmentation function 122, can utilize the one or more interfaces to obtain the stream output or control the sensor device 110. Also, in an example, stream augmenting component 116 may expose one or more interfaces for obtaining stream output therefrom (e.g., from an augmentation function thereof) or controlling one or more aspects of the stream augmenting component 116 (e.g., of an augmentation function thereof), and augmented stream interface 136, based on instructions defined for the augmentation function 122, can utilize the one or more interfaces to obtain the stream output or control the stream augmenting component 116 (e.g., or an augmentation function thereof).

In one example, augmentation function 122 can access one or more interfaces for one or more devices for controlling the one or more devices based on accessing one or more interfaces to obtain the stream output from the one or more devices. For example, augmentation function 122 can access the one or more interfaces to activate, modify one or more operation parameters, etc. for one or more devices based on receiving stream output from one or more other devices. In a specific example, augmentation function 122 can activate sensor device 108 via sensor interface 1 132 based on receiving data from sensor device 110 via sensor interface 134, modify an operating parameters of sensor device 108 via sensor interface 1 132, such as a time offset, based on receiving data from sensor device 110 via sensor interface 2 134, etc.

In method 200, at action 206, a plurality of stream outputs from the one or more devices can be virtualized to the output stream. In an aspect, augmentation function 122, e.g., in conjunction with stream server 106, processor 102, memory 104, etc., can virtualize the plurality of stream outputs from the one or more devices to the output stream. In one example, augmentation function 122 can virtualize stream outputs from sensor device 108 (via sensor interface 1 132), sensor device 110 (via sensor interface 2 134), and stream augmenting component 116 output (via augmented stream interface 136) into the output stream (e.g., stream output 140). In one example, augmentation function 122 can generate the single output stream with aggregated data and/or based on further modification and/or correlation of the stream outputs based on the augmentation function 122.

In one example, augmentation function 122 can aggregate data from the various sensor devices 108, 110, stream augmenting components 116, etc. into the single output stream, and thus stream output 140 can output data as it is received from the sensor devices 108, 110, stream augmenting component 116, etc. For example, the single output stream may output framed data where each frame may have a container for data of a specific type (e.g., of a specific device, as modified by the augmentation function 122, etc.), where a receiving application or stream augmenting component can access the containers to obtain the data in the single output stream. In another example, in virtualizing the plurality of stream outputs, optionally at action 208, data from each of the plurality of stream outputs can be correlated in single output stream. In an aspect, augmentation function 122, e.g., in conjunction with stream server 106, processor 102, memory 104, etc. can correlate the data from each of the plurality of stream outputs into the output stream (e.g., stream output 140). In an example, augmentation function 122 can utilize many different types of correlation functions, such as a spatial correlation function, a temporal correlation function, etc. to correlate data received from the plurality of stream outputs to the output stream.

For example, augmentation function 122 can implement temporal correlation to correlate output streams of sensor devices 108, 110 based on a time related to framed data received in the output streams (e.g., based on a timestamp associated with the framed data), and can deliver temporally correlated framed data from both sensor devices 108, 110 (e.g., based on determining framed data from the sensor devices 108, 110 having similar timestamps) to the output stream. In another example, augmentation function 122 can implement a spatial correlation to correlate output streams of sensor devices 108, 110 based on other data, such as position from a gyroscope, location from a GPS receiver, etc. For example, augmentation function 122 can correlate framed data from sensor devices 108, 110 based on determining that the frames are associated with similar spatial data, which may be obtained from other input sources. In another example, augmentation function 122 may spatially correlate the stream output of framed data from sensor devices 108, 110 to expose data from the sensor devices 108, 110 at a time when input data from a microphone achieves a volume level threshold (e.g., stream camera frames when there is sufficient audio activity).

Thus, for example, in virtualizing the plurality of stream outputs, optionally at action 210, data can be modified based on additional input from other input devices. In an aspect, augmentation function 122, e.g., in conjunction with stream server 106, processor 102, memory 104, etc., can modify the data based on additional input from other input devices. In another example, augmentation function 122 can modify the data based on adding metadata from other input devices (e.g., position data from a gyroscope, location data from a GPS, etc.) to framed data in stream output 140. In an example, other input device 112 may expose one or more interfaces for obtaining output therefrom or controlling one or more aspects thereof, and other input interface 136, based on instructions defined for the augmentation function 122, can utilize the one or more interfaces to obtain the output or control the other input device 112.

In method 200, at action 212, the output stream can be output. In an aspect, augmentation function 122, e.g., in conjunction with stream server 106, processor 102, memory 104, etc., can output the output stream (e.g., as stream output 140). For example, augmentation function 122 can output the output stream to an interface for consumption by (or delivery to) one or more applications 124, 126, other stream augmenting components 120, etc. In an example, augmentation function 122 can output the output stream as framed data transmitted at a cadence, which may include correlated stream outputs from various sensor devices, additional data from other input devices, etc., as described. In one example, augmentation function 122 can output the output stream at a cadence similar to that of one or more of sensor devices 108, 110, a cadence of the faster or slower of sensor devices 108, 110, a least common cadence of sensor devices 108, 110, a different defined cadence, etc. In an example, augmentation function 122 can also indicate one or more parameters regarding the stream output 140 (e.g., in the configuration), such as cadence, frame size or length, etc. For example, an application 124, 126, another stream augmenting component 120, etc. can obtain and utilize the stream output 140. In an example, augmentation function 122 can output the output stream based on a certain file or output type, as a multiplexed stream of the output streams allowing for separating certain parts of the multiplexed stream (e.g., by one or more applications or other stream augmenting components consuming the output stream), etc.

In method 200, optionally at action 214, the output stream can be exposed for use by other stream augmenting components. In an aspect, stream server 106, e.g., in conjunction with processor 102, memory 104, etc., can expose the output stream (e.g., stream output 140) for use by other stream augmenting components (e.g., stream augmenting component 120). For example, stream server 106 can expose the output stream in a configuration accessible by the other stream augmenting components to allow the stream augmenting components to consume and/or modify the output stream. In another example, the other stream augmenting components can be initialized based on initialization of stream augmenting component 118, and exposing the output stream to the other stream augmenting components can be based on initializing and/or executing the other stream augmenting components. In an example described further herein, stream server 106 can expose the output stream as a multiplexed stream having framed data sent for each of a plurality of frames (e.g., according to a cadence) for each sensor device 108, 110, and having a container for each data (e.g., a container specific to a given sensor device 108, 110) that can be accessed via a context.

As described, the stream augmenting component 118 can facilitate hiding some functions or interfaces to the devices and/or other stream augmenting components. In this example, stream augmenting component 118 can expose output streams (e.g., stream output 140) that are different from those provided via interfaces 132, 134, 136, 138. In a specific example, stream augmenting component 116 may be provided by a hardware vendor of sensor device 1, and may expose a lens corrected output stream. Stream augmenting component 118 can obtain the lens corrected output stream via augmented stream interface 136 and use this output stream in generating the stream output 140, but may not expose an output stream corresponding to the lens corrected output stream as received from the stream augmenting component 116 or the raw data output stream from the sensor device 108. In this regard, stream augmenting components (e.g., stream augmenting component 120) leveraging stream output 140 from augmentation function 122 may only be able to access output streams via interfaces exposed by stream augmenting component 118.

In this regard, in method 200, optionally at action 216, another stream augmenting component having an augmentation function with an interface to access the output stream can be initialized. In an aspect, stream server 106, e.g., in conjunction with processor 102, memory 104, etc., can initialize another stream augmenting component (e.g., stream augmenting component 120) having an augmentation function with an interface to access the output stream. This other stream augmenting component can obtain data from the stream output 140 and modify the data for outputting in another stream output.

FIG. 3 is a flowchart of an example of a method 300 for providing a stream augmenting component for interfacing with multiple input devices or other stream augmenting components to generate an output stream for consumption by an application or other stream augmenting component. For example, method 300 can be performed by a device 100 and/or one or more components thereof to facilitate providing one or more pluggable stream augmenting components.

In method 300, optionally at action 302, one or more parameters regarding interfaces indicated for one or more devices or stream augmenting components can be received. In an aspect, stream augmenting component 118, e.g., in conjunction with stream server 106, processor 102, memory 104, etc., can receive the one or more parameters regarding the interfaces indicated for the one or more devices (e.g., sensor devices 108, 110, input devices 112, 114, etc.) or stream augmenting components (e.g., stream augmenting component 116). In an example, stream augmenting component 118 may receive the one or more parameters as part of performing an initialization on the stream server 106 to determine which augmentation functions can be activated based on whether associated interfaces indicated in a configuration for the augmentation functions are available. Thus, for example, during initialization, stream augmenting component 116 can receive the one or more parameters including a list of available interfaces to one or more devices or other stream augmenting components from the stream server 106, and may determine whether interfaces defined in its augmentation functions (e.g., augmentation function 122) are present. In another example, during initialization, stream augmenting component 116 can indicate the configuration to the stream server 106 indicating interfaces for its augmentation functions, and can receive the one or more parameters as an indication from the stream server 106 of which or whether interfaces for a given augmentation function are available.

In method 300, at action 304, a stream augmenting configuration indicating one or more augmentation functions related to a stream augmenting component can be indicated. In an aspect, stream augmenting component 118, e.g., in conjunction with stream server 106, processor 102, memory 104, etc., can indicate the stream augmenting configuration indicating the one or more augmentation functions (e.g., augmentation function 122) related to the stream augmenting component 118. For example, indicating the stream augmenting configuration can include providing the configuration to stream server 106 to allow the stream server 106 to initialize the stream augmenting component 118 and/or determine which other stream augmenting components can be initialized based on configurations for the various stream augmenting components. For example, as described, a stream augmenting component may leverage an output stream of another stream augmenting component, and thus stream server 106 can receive indicated configurations and determine which stream augmenting components can be activated based on whether stream augmenting components exposing utilized interfaces are present (e.g., are configured or are initialized by stream server 106). In another example, stream augmenting component 118 can indicate the configuration to the stream server 106 and/or other stream augmenting components (e.g., via the stream server 106 or otherwise) to facilitate determining types of stream outputs provided by the stream augmenting component 118 and accordingly generate or initialize stream augmenting components that obtain and modify data of the stream output 140 of augmentation function 122 of stream augmenting component 118.

In method 300, optionally at action 306, one or more devices or stream augmenting components can be controlled based on one or more interfaces indicated by the one or more augmentation functions. In an aspect, augmentation function 122, e.g., in conjunction with stream server 106, processor 102, memory 104, etc., can control the one or more devices (e.g., sensor device 108, 110, input device 112, etc.) or stream augmenting components (e.g., stream augmenting component 116) based on one or more interfaces indicated by the one or more augmentation functions (e.g., augmentation function 122). For example, augmentation function 122 can activate the one or more devices or stream augmentation components via a corresponding interface thereto (e.g., sensor interface 1 132, sensor interface 2 134, augmented stream interface 136, other input interface 138, etc.). In another example, augmentation function 122 can modify one or more parameters for operating the devices or stream augmenting components via the corresponding interfaces, such as a timing offset for operating the devices or components, etc.

In an example, augmentation function 122 can control the one or more devices or stream augmenting components based in part on receiving data in an output stream from one or more other devices or stream augmenting components, based in part on determining to control other devices or stream augmenting components, etc. In one specific example, augmentation function 122 can control sensor device 108 via sensor interface 1 132 to activate the sensor device 108, and can determine to also activate sensor device 110 via sensor interface 2 134 concurrently with sensor device 108 (e.g., based on determining to activate sensor device 108). In another specific example, augmentation function 122 can determine a timing offset between output streams received from sensor device 108 and sensor device 110 (e.g., based on a timestamp in data output via the output streams), and can control one or more of the sensor device 108 or sensor device 110 via the corresponding interface to operate using a timing offset, which can result in temporally correlated data from the sensor devices 108, 110.

In method 300, at action 308, a plurality of output streams corresponding to the plurality of interfaces for at least one augmentation function can be received. In an aspect, augmentation function 122, e.g., in conjunction with stream server 106, processor 102, and/or memory 104, can receive the plurality of output streams corresponding to the plurality of interfaces (e.g., interface 132, 134, 136, 138) for the at least one augmentation function (e.g., augmentation function 122). For example, stream server 106 can output the output streams as received from the corresponding devices (e.g., sensor devices 108, 110, input device 112, etc.) and/or stream augmenting components (e.g., stream augmenting component 116) to one or more applications, stream augmenting components (e.g., stream augmenting component 118), etc., based on the corresponding plurality of interfaces thereto. Moreover, in this regard, receiving the output streams can include receiving data from the output streams (e.g., framed data as output by the devices or stream augmenting components, other input data as output by other input devices, etc.). Accordingly, in an example, augmentation function 122 can receive framed data from the various output streams at varying cadences, and/or receive other input data when requested, etc.

In method 300, at action 310, data from the plurality of streams can be modified to generate one or more stream outputs for the at least one augmentation function. In an aspect, augmentation function 122, e.g., in conjunction with stream server 106, processor 102, memory 104, etc., can modify data from the plurality of streams to generate one or more stream outputs for the at least one augmentation function. For example, augmentation function 122 can aggregate data from the plurality of streams, as described, for including in an output stream (e.g., stream output 140), correlate data from the plurality of streams based on a temporal correlation, spatial correlation, etc., output data with additional metadata (e.g., position or location information regarding the stream data), alter the data (e.g., based on other input data), etc. For example, augmentation function 122 can alter the data based on additional input data, which may include one or more filters for modifying the data, such as lens correction information for a camera sensor or other filters for images from a camera sensor (e.g., to reduce noise, reduce red eye, provide white noise balance, etc.), and/or the like. In any case, augmentation function 122 can modify the data to provide an augmented output stream.

In method 300, at action 312, the one or more stream outputs can be provided as input to at least one of an application or another stream augmenting component. In an aspect, stream server 106, e.g., in conjunction with augmentation function 122, stream augmenting component 118, processor 102, memory 104, etc. can provide the one or more stream outputs as input to at least one of an application (e.g., application 124, 126) or another stream augmenting component (e.g., stream augmenting component 120). For example, once the other stream augmenting component is activated or otherwise initialized, stream server 106 can provide output from the one or more stream outputs (e.g., stream output 140) to the one or more stream augmenting components 120, or to the applications 124, 126 executing and requesting the stream output(s) via a corresponding interface.

FIG. 4 is a flowchart of an example of a method 400 for facilitating operation of stream augmenting components for interfacing with multiple input devices or other stream augmenting components to generate and utilize output streams. For example, method 400 can be performed by a device 100 and/or one or more components thereof (e.g., a stream server 106) to facilitate providing one or more pluggable stream augmenting components.

In method 400, at action 402, a first stream augmenting configuration can be received for a first stream augmenting component indicating, for at least one augmentation function, a plurality of requested interfaces and one or more stream outputs. In an aspect, stream server 106, e.g., in conjunction with processor 102, memory 104, etc., can receive the first stream augmenting configuration for a first stream augmenting component (e.g., stream augmenting component 118) indicating, for at least one augmentation function (e.g., augmentation function 122), a plurality of requested interfaces (e.g., interfaces 132, 134, 136, 138) and one or more stream outputs (e.g., stream output 140). In an example, the first stream augmenting configuration indicating the one or more stream outputs may indicate one or more interfaces exposed by the first stream augmenting component to receive the one or more stream outputs. In addition, the first stream augmenting configuration may also indicate one or more interfaces for controlling one or more aspects of the augmentation function 122 (e.g., to activate the augmentation function 122, apply a timing offset to stream output 140, etc.).

In an example, stream server 106 may receive the first stream augmenting configuration from the stream augmenting component 118 as part of a registration process for registering stream augmenting component 118 for use by the stream server 106, as part of initializing stream augmenting component 118 for executing via the stream server, 106, etc. In any case, stream server 106 may utilize the first stream augmenting configuration to determine one or more interfaces that may be exposed for use by other stream augmenting components and/or applications executing on an operating system of device 100 (e.g., which may be the operating system also executing stream server 106).

In method 400, at action 404, the one or more stream outputs can be indicated to a second stream augmenting component. In an aspect, stream server 106, e.g., in conjunction with stream augmenting component 118, processor 102, memory 104, etc., can indicate the one or more stream outputs (e.g., stream output 140) to a second stream augmenting component (e.g., stream augmenting component 120). For example, stream server 106 may expose the one or more stream outputs of stream augmenting component 118 (e.g., via one or more interfaces) for generating or initializing the second stream augmenting component 120. As described, in an example, stream server 106 may indicate the one or more stream outputs based on providing a list of available interfaces to the second stream augmenting component 120 (e.g., in a client context as described below in FIG. 5), based on determining whether one or more requested interfaces are available for the second stream augmenting component 120, etc.

In method 400, at action 406, a second stream augmenting configuration can be received from the second stream augmenting component indicating an interface corresponding to at least one of the one or more stream outputs of the first stream augmenting configuration. In an aspect, stream server 106, e.g., in conjunction with processor 102, memory 104, etc., can receive the second stream augmenting configuration from the second stream augmenting component (e.g., stream augmenting component 120) indicating an interface corresponding to at least one of the one or more stream outputs of the first stream augmenting configuration. As described, stream server 106 can receive the second stream augmenting configuration as part of a registration process for registering stream augmenting component 120 for use by the stream server 106, as part of initializing stream augmenting component 120 for executing via the stream server, 106, etc. In any case, stream server 106 can initialize the second stream augmenting component 120 to receive stream output 140 from first stream augmenting component 118.

In method 400, optionally at action 408, one or more streams from one or more devices or stream augmenting components and/or input data from one or more other inputs can be obtained based on the plurality of interfaces. In an aspect, stream server 106, e.g., in conjunction with processor 102, memory 104, etc., can obtain the one or more streams from one or more devices (e.g., sensor devices 108, 110) or stream augmenting components (e.g., stream augmenting component 116) and/or input data from one or more other inputs (e.g., other input device 112) based on the plurality of interfaces (e.g., interfaces 132, 134, 136, 138) indicated in the stream augmenting configuration. For example, stream server 106 can obtain the one or more streams or other input data based on the first stream augmenting configuration, which may include receiving the one or more streams according to a cadence of the streams, requesting other input data based on a request indicated by the first stream augmenting configuration or a corresponding augmentation function, etc.

In method 400, optionally at action 410, the one or more streams and/or input data can be provided to the first stream augmenting component. In an aspect, stream server 106, e.g., in conjunction with processor 102, memory 104, etc., can provide the one or more streams and/or input data to the first stream augmenting component 118. As described, for example, stream server 106 can provide the one or more streams and/or other input data to the stream augmenting component 118 over corresponding interfaces 132, 134, 136, 138, which may include providing the one or more streams based on a cadence of the streams as received from the corresponding devices/stream augmenting components. Moreover, as described, stream augmenting component 118 can receive the streams and/or input data, and generate the one or more stream outputs (e.g., stream output 140), which can be provided to the stream server 106 for exposing to one or more other stream augmenting components or applications via a corresponding interface.

In method 400, at action 412, the at least one stream output provided by the at least one augmentation function of the first stream augmenting component can be received. In an aspect, stream server 106, e.g., in conjunction with processor 102, memory 104, etc., can receive the at least one stream output (e.g., stream output 140) provided by the at least one augmentation function (e.g., augmentation function 122) of the first stream augmenting component (e.g., stream augmenting component 118). For example, receiving the at least one stream output may include receiving data over the stream output as indicated by the first stream augmenting configuration. For example, stream server 106 can receive the at least one stream output from the at least one augmentation function as framed data sent based on a cadence, as described herein.

In method 400, at action 414, the at least one stream output can be provided to the second stream augmenting component. In an aspect, stream server 106, e.g., in conjunction with processor 102, memory 104, etc., can provide the at least one stream output (e.g., stream output 140) to the second stream augmenting component (e.g., stream augmenting component 120). For example, stream server 106 can expose the stream output 140 for receiving by the second stream augmenting component 120 as framed data sent based on a cadence by the first stream augmenting component 118, as described. Second stream augmenting component 120, for example, may utilize the stream output 140 as input to generate another augmented stream output.

Figure 5:
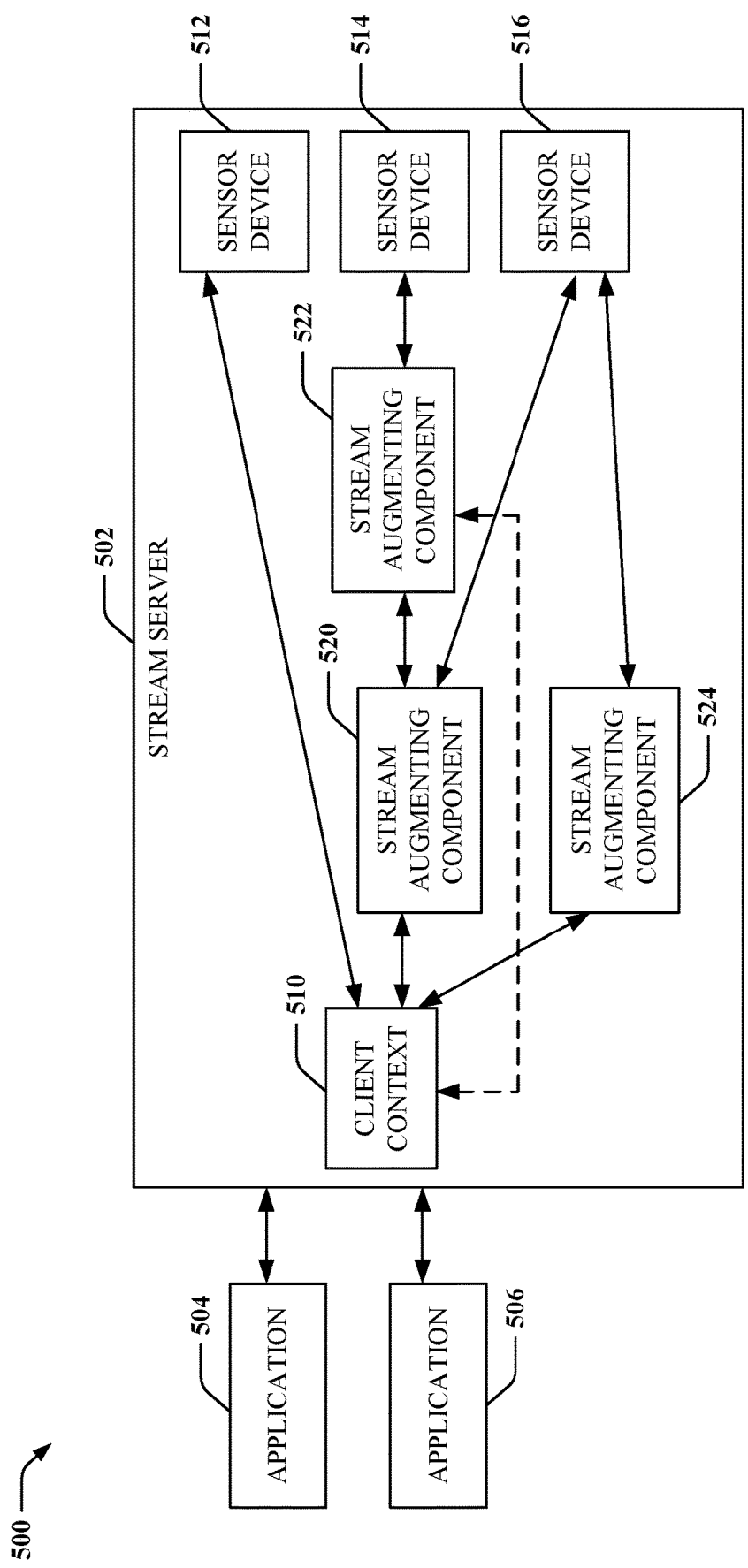
FIG. 5 is a schematic diagram of an example of a device having a plurality of stream augmenting components configured in a stream server.

FIG. 5 is a schematic diagram of an example of a device 500 that can implement a stream server for providing access to one or more sensor devices. Device 500, which can be similar to device 100 of FIG. 1, can include a stream server 502, which can execute via a processor 102 and/or memory 104 of device 500, as described above with respect to device 100. Stream server 502 may be similar to stream server 106 in FIG. 1. For example, device 500 can execute an operating system on which the stream server 502 can execute. Additionally, device 500 can include one or more applications 504, 506 (e.g., similar to applications 124, 126 in FIG. 1) that can also execute on the operating system and/or access one or more streams from the stream server 502 (e.g., for providing data therefrom to an interface or otherwise utilizing data from the stream).

In an example, stream server 502 can include a client context 510 that can expose various interfaces to one or more sensor devices 512, 514, 516, and/or stream augmenting components 520, 522, 524 for utilization by the applications 504, 506 to control one or more devices 512, 514, 516, or components 520, 522, 524 and/or to obtain data streams therefrom. As described above, the stream augmenting components 520, 522, 524 can be pluggable components that are initialized by the stream server 502 based on determining whether interfaces defined for the stream augmenting components 520, 522, 524 (e.g., in a configuration thereof) are available. As described, for example, stream server 502 can initialize the stream augmenting components 520, 522, 524 in a hierarchy to ensure at least interfaces related to other stream augmenting components may be available. Accordingly, for example, stream server 502 may initialize stream augmenting component 522, and then initialize stream augmenting component 520 so an interface from stream augmenting component 522 can be determined to be available when initializing stream augmenting component 520. In this regard, the stream augmenting components can be extended horizontally by chaining the stream augmenting components (e.g., stream augmenting components 520, 522, and so on where additional stream augmenting components can be between client context 510 and sensor device 514), or vertically by interfacing with multiple inputs (e.g., client context 510 communicating with sensor devices 512, 514, and 516 (e.g., via stream augmenting components 520, 522, and 524), etc.).

In addition, for example, access to sensor devices 512, 514, 516, or stream augmenting components 520, 522, 524 via client context 510 can be hierarchical as depicted, such that accessing a stream from, or controlling, sensor device 514 can occur via stream augmenting component 522, which can occur via stream augmenting component 520 based on interfaces exposed by stream augmenting component 520. In an example, sensor device 514 may include a camera that exposes a raw data stream output based on capturing images by the camera. Stream augmenting component 522, for example, may define an augmentation function for providing an interface to a lens corrected output stream based on lens correction data provided by a vendor of the camera in stream augmenting component 522. Stream augmenting component 520 can obtain the lens correction data via the interface to stream augmenting component 522, but may not be able to access sensor device 514 directly to receive the raw output stream from the camera. Thus, for example, stream augmenting component 522 may limit interaction with sensor device 514 by other applications and/or sensor augmenting components based on the exposed interfaces.

Similarly, stream augmenting component 520 can obtain the lens corrected output stream and additionally modify the lens corrected output stream, such as by spatially correlating the lens corrected output stream with an output stream from sensor device 516, such as a microphone. In a specific example, stream augmenting component 520 may provide an augmentation function defining an interface for providing an output stream of images from the camera related to sensor device 514 when the audio from the microphone related to sensor device 516 achieves a threshold volume level. Thus, client context 510 can access this interface via stream augmenting component 520, but may not be able to access other interfaces/augmentation functions of the stream augmenting component 522 and/or sensor device 514. In another example, stream augmenting component 522 may provide an augmentation function defining an interface for the lens corrected output stream (e.g., and/or an interface to control the stream augmenting component 522, which may control sensor device 514) directly to the client context 510. Moreover, for example, stream augmenting component 520 may provide an augmentation function to defining an interface for an output stream (e.g., and/or an interface to control the stream augmenting component 520) for sensor device 516.

In other examples, as shown, client context 510 may access stream augmenting component 524 to receive an output stream from, or possibly control one or more parameters of, sensor device 516. Additionally, for example, client context 510 may be able to access sensor device 512 directly to obtain an output stream and/or modify one or more parameters thereof without a stream augmenting component (e.g., a stream augmenting component may not be present for sensor device 512).

Figure 6:
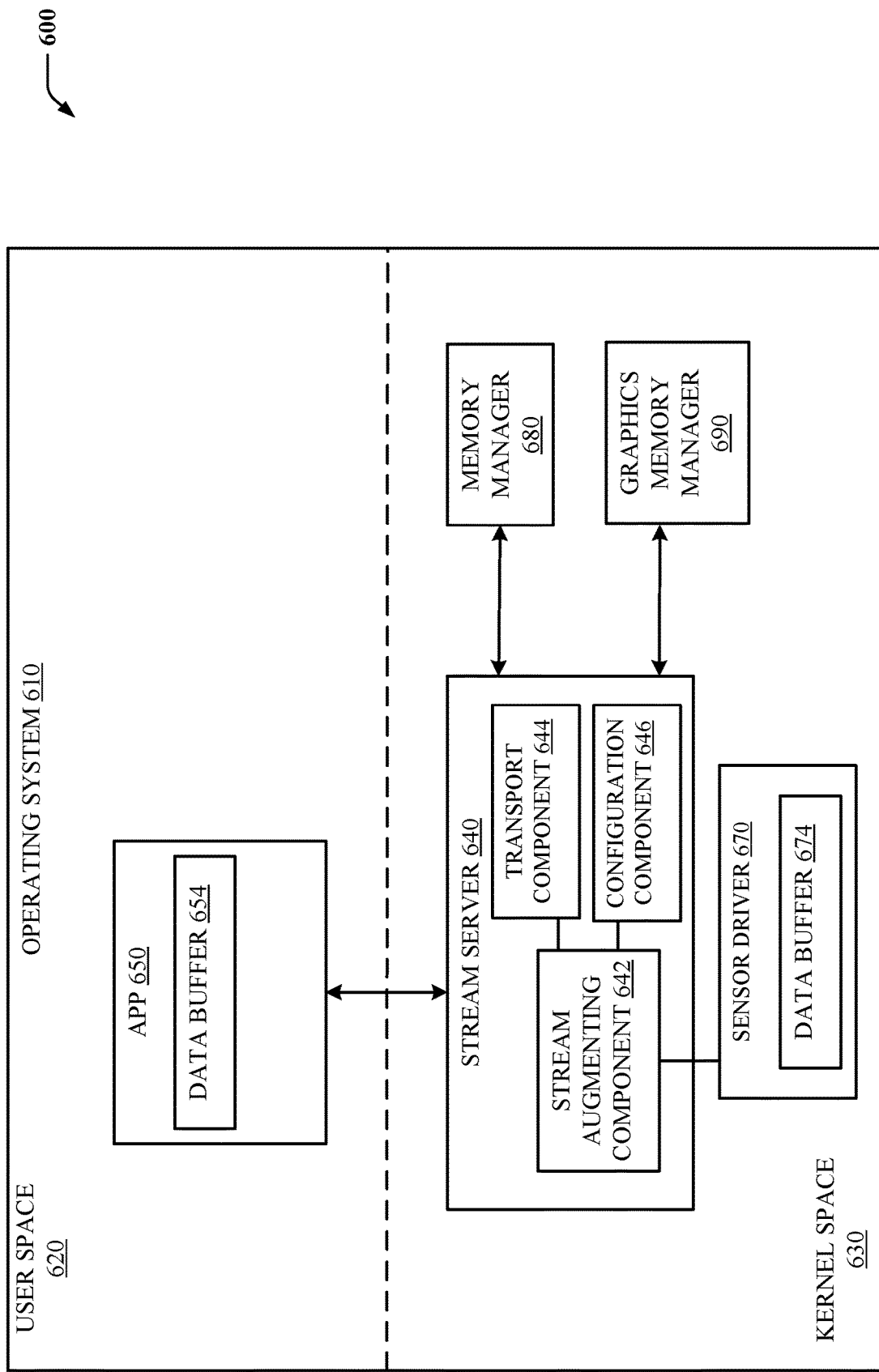
FIG. 6 is a schematic diagram of an example of a software architecture for implementing a stream server and stream augmenting components.

FIG. 6 is a system diagram of an example of a software architecture 600 for using a stream server 640 and/or corresponding stream augmenting components. An operating system 610 can manage the execution of applications, manage the exchange of information among the applications, and provide services for the applications, such as by providing an interface to hardware sensors. The OS 610 can also include a stream server 640, which can be used to discover and configure one or more stream augmenting components 642, and to manage transport of data from the resources of the stream server 640 to the applications. For example, software architecture 600 can be executed by a device 100, 500 (e.g., via a processor 102, memory 104, etc.) to provide the aspects described below. Moreover, stream server 640 may be similar to a stream server 106, 502, and stream augmenting component 642 (which may include multiple stream augmenting components) may be similar to stream augmenting components 116, 118, 120, 520, 522, 524, etc.

The OS 610 can divide the memory (e.g., memory 104 of a device 100) into different spaces corresponding to different privilege levels, where higher privileged processes have more access to memory and services and lower privileged processes have less access to memory and services. For example, the OS 610 can divide the memory into a user space 620 and a kernel space 630. Applications (such as the application 650) and lower privileged software routines can operate in the user space 620 and higher privileged services of the OS 610 can operate in the kernel space 630. Separating the memory into the user space 620 and the kernel space 630 can increase security, privacy, and fault tolerance of the OS 610 by limiting memory access of potentially faulty or malicious applications.

The OS 610 can include different software routines, modules, or components for managing different aspects of the execution of programs. For example, the OS 610 can include a stream server 640 for managing streaming data, a memory manager 680 for managing virtual and physical memory, a graphics memory manager 690 for managing graphics memory, and a sensor driver 670 for initializing and managing a hardware sensor (e.g., a sensor device, such as sensor device 108, 110, 512, 514, 516). For example, the memory manager 680 can be used to create a virtual memory space for a new process or application when the process is started, to allocate the virtual memory for various purposes, and to map virtual addresses to physical addresses and/or locations in secondary storage. The memory manager 680 can track the virtual to physical mappings using page tables. The memory manager 680 typically uses physical memory that is located within the system memory that is closely coupled to a CPU. The graphics memory manager 690 can be similar to the memory manager 680, except that the graphics memory manager 690 can be used with graphics memory that is closely coupled to a GPU. Thus, the graphics memory manager 690 and the memory manager 680 operate on different non-overlapping portions of physical memory.

The sensor driver 670 can be used by the OS 610 to communicate with a hardware sensor. For ease of illustration, a single sensor driver 670 is shown, but there can be multiple sensor drivers, such as a sensor driver for each type of sensor of the device. The sensor driver 670 can be used to initialize and/or update registers of the sensors so that the sensor can be controlled. The sensor driver 670 can be used to read the registers of the sensor so that the OS 610 is aware of when data is available from the sensor. The sensor can also have embedded memory within the sensor for storing data collected by the sensor, and the sensor driver 670 can be used to manage the transport of the data from the embedded physical memory to the OS 610.

The stream server 640 can use the stream augmenting component 642 to manage the configuration of the sensors, transport of data from the sensors, modify data transported from the sensors, etc. For example, the stream server 640 can include a transport component 644 for managing data transport and a configuration component 646 for managing configuration of the sensors, which may be via interfaces provided from stream augmenting component 642, as described. Stream server 640, e.g., via a client context, may publish topologies representative of available stream augmenting components 642 and corresponding interfaces to access one or more other stream augmenting components and/or sensors.

The configuration component 646 can also be used to create a buffer (e.g., data buffers 654 and 674) for transporting data from a sensor to an application. For example, when the sensor is used for the first time, a process (a producer process) and a virtual memory space can be created for the sensor device. The producer process can be used to produce and manage data transfer from the sensor and can include software routines of the sensor driver 670. An application or stream augmenting component that is using the sensor data can be running in a different process (a consumer process). The producer process can be created as part of an initialization sequence of a device, when the application requests to use the sensor, or in response to launching an application associated with the sensor, for example. Physical memory can be allocated for the data buffer associated with the sensor. In particular, the data buffer can be allocated in a virtual address range of the producer process and physical memory can be mapped to the virtual address range. For example, the memory can be allocated by calling a service of the memory manager 680, the graphics memory manager 690, and/or the sensor driver 670. Thus, the physical memory can be system memory which is closely coupled with the CPU, graphics memory which is closely coupled with the GPU, and/or embedded sensor memory which is closely coupled with the sensor. An address from within each page can be read (or probed) and locked in the physical memory. Locking the memory includes keeping the pages of the data buffer resident in physical memory so that the pages are not paged out to secondary storage. The physical memory can be shared with the calling or consuming application by assigning the physical memory pages to virtual addresses of the consuming process. Thus, different virtual addresses can map to the same physical address. The mappings of the producer virtual addresses, the consumer virtual addresses, and the physical addresses can be kept in a memory descriptor list or other data structure. A memory descriptor list can be an array or linked list of valid memory locations.

It should be noted that for ease of illustration, the description above describes only one division of functionality between the user space 620 and the kernel space 630. However, other divisions are possible. As one example, the stream augmenting component 642 can be assigned to either the user space 620 or the kernel space 630. Also, the description above describes only one organization of the software functions of the OS 610. For example, the stream augmenting component 642 can be part of the stream server 640, or the stream augmenting component 642 can be separate from, but in communication with, the stream server 640, etc.

Figure 7:
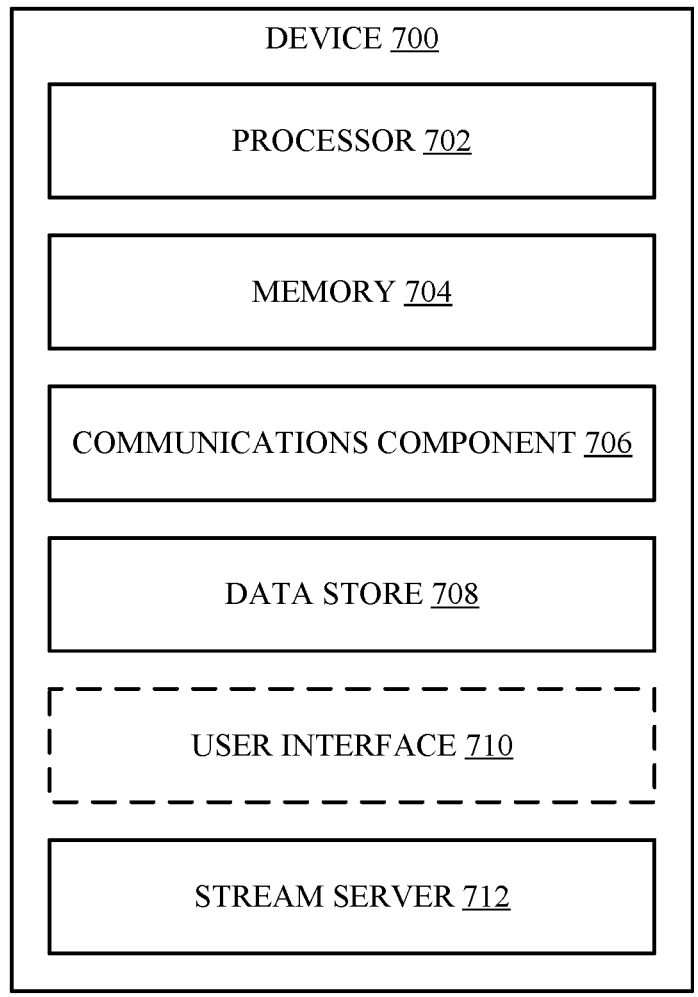
FIG. 7 is a schematic diagram of an example of a device for performing functions described herein.

FIG. 7 illustrates an example of device 100 including additional optional component details as those shown in FIG. 1. In one aspect, device 700 may include processor 702, which may be similar to processor 102, for carrying out processing functions associated with one or more of components and functions described herein. Processor 702 can include a single or multiple set of processors or multi-core processors. Moreover, processor 702 can be implemented as an integrated processing system and/or a distributed processing system.

Device 100 may further include memory 704, which may be similar to memory 104, such as for storing local versions of applications being executed by processor 702, such as stream server 712, applications related instructions, parameters, etc. Memory 104 can include a type of memory usable by a computer, such as random access memory (RAM), read only memory (ROM), tapes, magnetic discs, optical discs, volatile memory, non-volatile memory, and any combination thereof.

Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for applications and/or related parameters (e.g., stream server 712, applications, etc.) not currently being executed by processor 702. In addition, data store 708 may be a data repository for stream server 712, applications, and/or one or more other components of the device 700.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 may additionally include a stream server 712, which may be similar to stream server 106, as described, for obtaining data or controlling a plurality of sensor devices or other input devices, and/or exposing modified output streams.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computing device for providing stream augmenting components, comprising:
   a memory storing one or more parameters or instructions for executing a stream server, wherein the stream server exposes one or more interfaces related to one or more stream augmenting components; and
   at least one processor coupled to the memory, wherein the at least one processor is configured to:
      initialize a stream augmenting component having an augmentation function indicating a plurality of interfaces to multiple devices and an output stream;
      access at least a portion of the plurality of interfaces to the multiple devices to obtain stream output from the multiple devices and control a first device of the multiple devices by modifying, based on the stream output received for at least a second device of the multiple devices, the stream output obtained from the first device;
      virtualize a plurality of stream outputs from the multiple devices to the output stream at least in part by modifying or correlating data received over the plurality of stream outputs; and
      output, by the stream augmenting component, the output stream to one or more other stream augmenting components or applications via at least another portion of the one or more interfaces.

2. The computing device of claim 1, wherein the stream output received for the second device is received from another augmentation function of another stream augmenting component that indicates an interface to the second device.

3. The computing device of claim 1, wherein the first device is a camera, wherein the second device is a depth camera, and wherein the at least one processor is configured to control the camera based at least in part on depth information in the stream output received from the depth camera.

4. The computing device of claim 1, wherein the at least one processor is further configured to initialize, based on initializing the stream augmenting component, another stream augmenting component having another augmentation function with another interface that accesses the output stream.

5. The computing device of claim 1, wherein the at least one processor is configured to virtualize the stream output at least in part by adding metadata from other devices to framed data in the stream output.

6. The computing device of claim 1, wherein the at least one processor is configured to access at least the portion of the plurality of interfaces for the multiple devices to control, based on an operating parameter, the multiple devices to modify the stream output from the multiple devices.

7. The computing device of claim 6, wherein the operating parameter is a time offset.

8. A method for providing stream augmenting components, comprising:
   initializing a stream augmenting component having an augmentation function indicating a plurality of interfaces to multiple devices and an output stream;
   accessing at least a portion of the plurality of interfaces to the multiple devices to obtain stream output from the multiple devices and control a first device of the multiple devices by modifying, based on the stream output received for at least a second device of the multiple devices, the stream output obtained from the first device;

virtualizing a plurality of stream outputs from the multiple devices to the output stream at least in part by modifying or correlating data received over the plurality of stream outputs; and outputting, by the stream augmenting component, the output stream to one or more other stream augmenting components or applications via at least a portion of one or more interfaces exposed by a stream server.

9. The method of claim 8, wherein the stream output received for the second device is received from another augmentation function of another stream augmenting component that indicates an interface to the second device.

10. The method of claim 8, wherein the first device is a camera, wherein the second device is a depth camera, and wherein controlling the camera is based at least in part on depth information in the stream output received from the depth camera.

11. The method of claim 8, further comprising initializing, based on initializing the stream augmenting component, another stream augmenting component having another augmentation function with another interface that accesses the output stream.

12. The method of claim 8, wherein virtualizing the stream output includes adding metadata from other devices to framed data in the stream output.

13. The method of claim 8, wherein accessing at least the portion of the plurality of interfaces includes accessing for the multiple devices to control, based on an operating parameter, the multiple devices to modify the stream output from the multiple devices.

14. The method of claim 13, wherein the operating parameter is a time offset.

15. A non-transitory computer-readable medium, comprising code executable by one or more processors for providing stream augmenting components, the code comprising code for:

initializing a stream augmenting component having an augmentation function indicating a plurality of interfaces to multiple devices and an output stream;

accessing at least a portion of the plurality of interfaces to the multiple devices to obtain stream output from the multiple devices and control a first device of the multiple devices by modifying, based on the stream output received for at least a second device of the multiple devices, the stream output obtained from the first device;

virtualizing a plurality of stream outputs from the multiple devices to the output stream at least in part by modifying or correlating data received over the plurality of stream outputs; and outputting, by the stream augmenting component, the output stream to one or more other stream augmenting components or applications via at least a portion of one or more interfaces exposed by a stream server.

16. The non-transitory computer-readable medium of claim 15, wherein the stream output received for the second device is received from another augmentation function of another stream augmenting component that indicates an interface to the second device.

17. The non-transitory computer-readable medium of claim 15, wherein the first device is a camera, wherein the second device is a depth camera, and wherein the code for accessing controls the camera based at least in part on depth information in the stream output received from the depth camera.

18. The non-transitory computer-readable medium of claim 15, further comprising code for initializing, based on initializing the stream augmenting component, another stream augmenting component having another augmentation function with another interface that accesses the output stream.

19. The non-transitory computer-readable medium of claim 15, wherein the code for virtualizing the stream output adds metadata from other devices to framed data in the stream output.

20. The non-transitory computer-readable medium of claim 15, wherein the code for accessing at least the portion of the plurality of interfaces accesses the multiple devices to control, based on an operating parameter, the multiple devices to modify the stream output from the multiple devices.

* * * * *